May 14, 1935. W. G. GORHAM ET AL 2,001,305
METHOD OF AND APPARATUS FOR THE PRODUCTION
OF GOODS OF RUBBER OR SIMILAR MATERIAL
Filed May 17, 1934 3 Sheets-Sheet 1
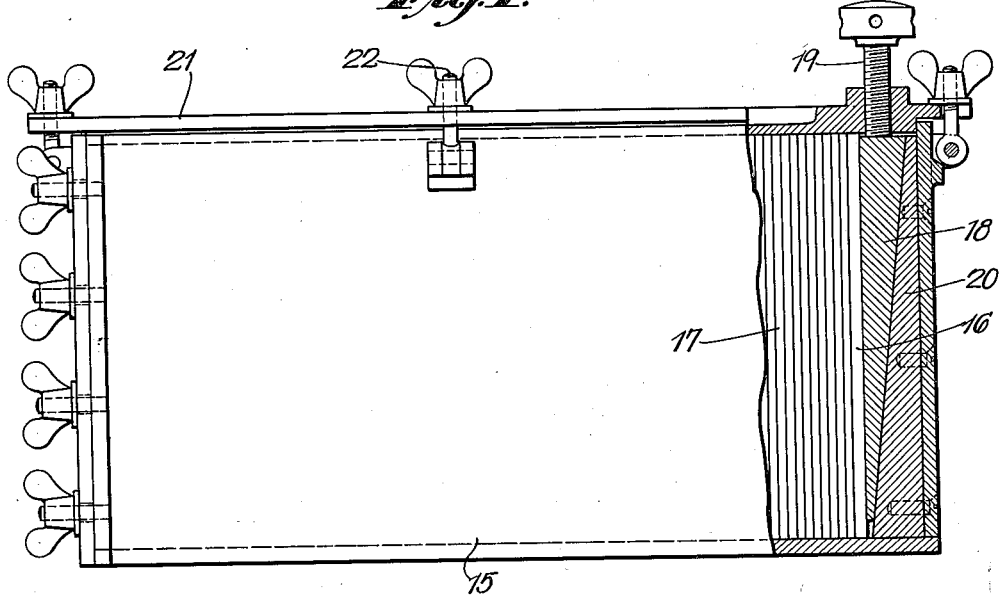
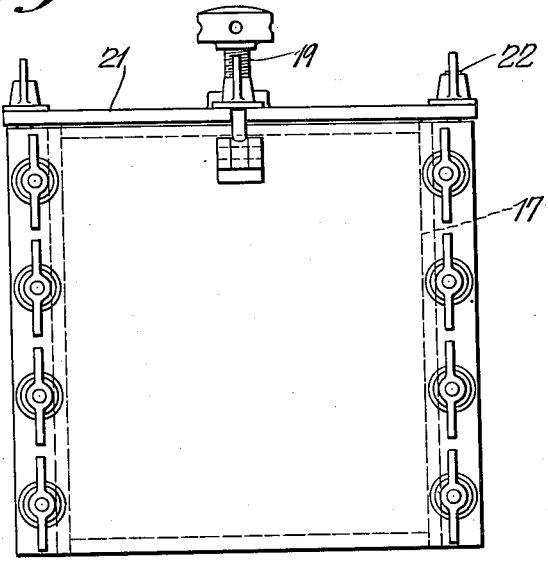
INVENTORS
WALTER GEORGE GORHAM.
GEOFFRY WILLIAM TROBRIDGE
BY
ATTORNEYS May 14, 1935.  W. G. GORHAM ET AL  2,001,305
METHOD OF AND APPARATUS FOR THE PRODUCTION
OF GOODS OF RUBBER OR SIMILAR MATERIAL
Filed May 17, 1934   3 Sheets-Sheet 2
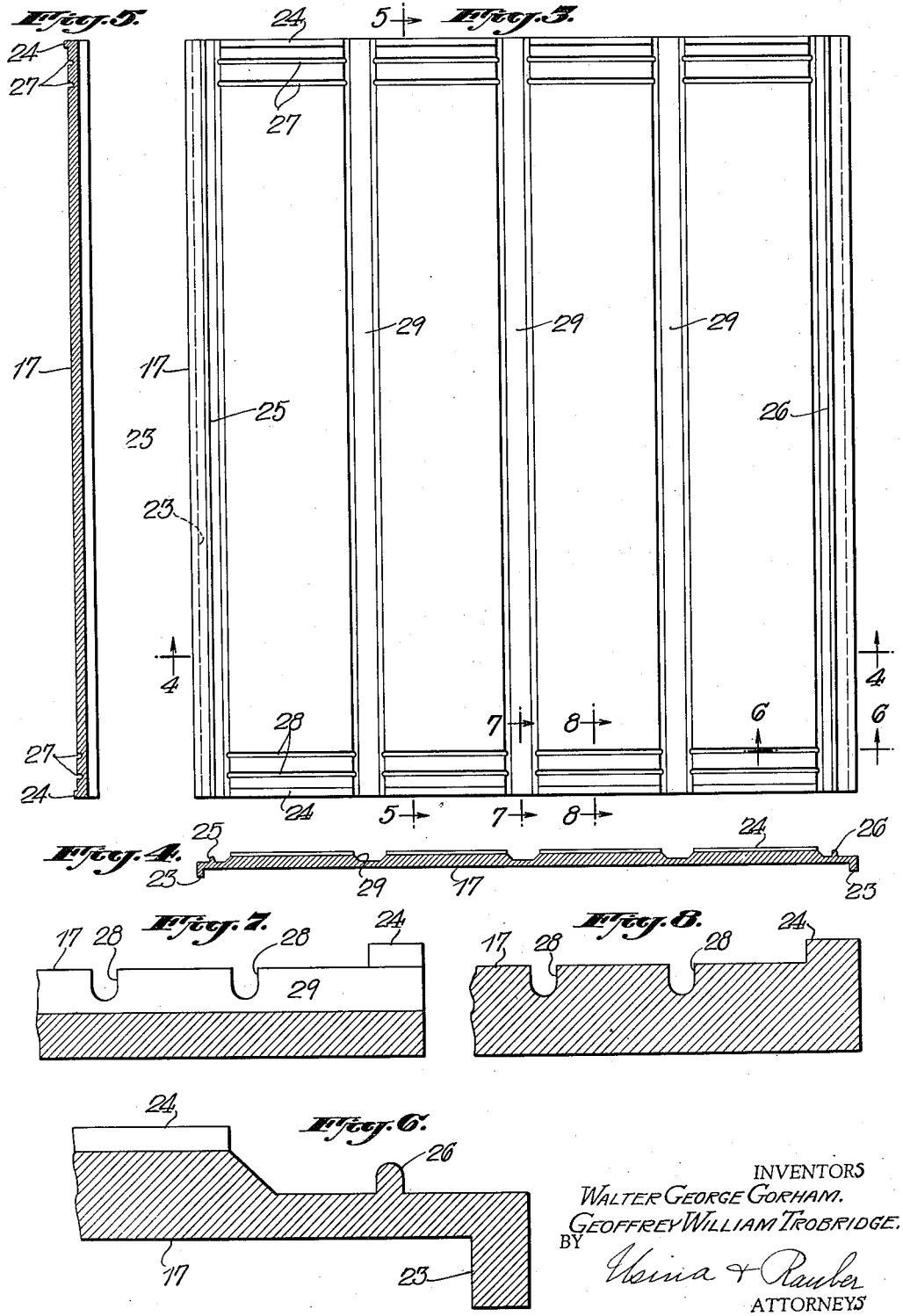
INVENTORS
WALTER GEORGE GORHAM.
GEOFFREY WILLIAM TROBRIDGE.
BY
ATTORNEYS

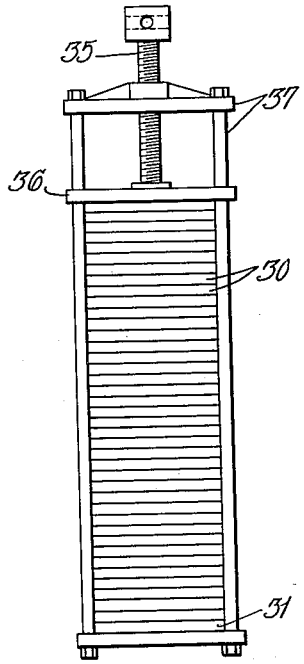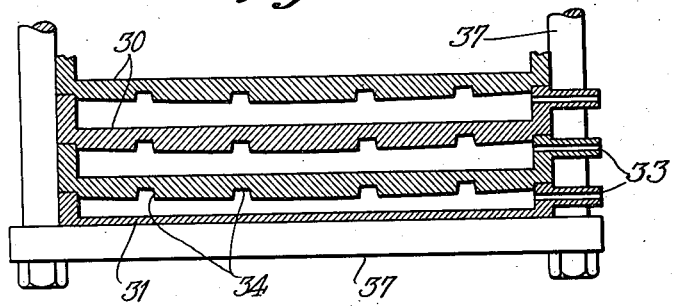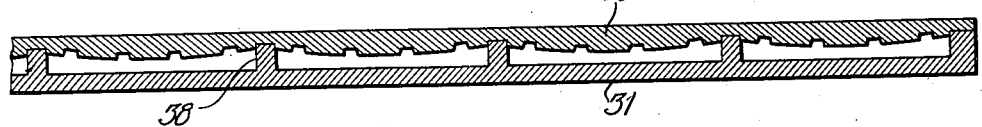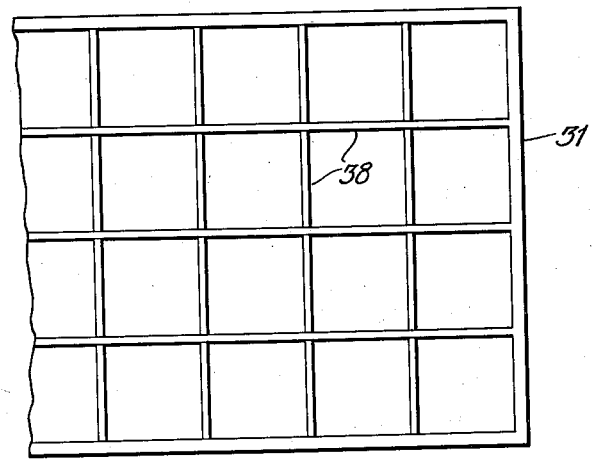

Patented May 14, 1935

2,001,305

UNITED STATES PATENT OFFICE 2,001,305

METHOD OF AND APPARATUS FOR THE PRODUCTION OF GOODS OF RUBBER OR SIMILAR MATERIAL

Walter George Gorham, Erdington, Birmingham, and Geoffrey William Trobridge, Sutton Coldfield, England, assignors to Dunlop Rubber Company Limited, London, England, a British company Application May 17, 1934, Serial No. 726,066
In Great Britain December 20, 1929

11 Claims.   (Cl. 18—26)

Our present invention relates to a method and an apparatus for molding aqueous dispersions of rubber material for the production of microporous articles by gelling and vulcanizing the gelled dispersion.

The present application is a continuation in part of our co-pending application Serial No. 500,184 filed December 5, 1930.

In the formation of microporous articles from aqueous dispersions of rubber materials, the dispersion is filled into a mold or into the desired shape, gelled and then vulcanized while preventing the water dispersed in the network of rubber material of the gel from escaping. Thereby the structure of the microscopic network of the gel is preserved and fixed in a final permanent form by the vulcanizing, after which the water enclosed therein may be permitted to evaporate, leaving microporous pores in the space occupied by the water during vulcanization.

In the molding or forming of certain articles as, for example, battery separator plates which are generally very thin, for example of the magnitude of 1/32d of an inch in thickness, it is important to prevent air bubbles, however minute, from being entrapped in the dispersion being molded because such bubbles or air spaces would create a serious defect in the resulting article. The pouring of a material such as a rubber dispersion into narrow mold spaces corresponding to such thin articles as battery separators without entrapping any air in the manners heretofore attempted, presents difficulties which, in many cases, are practically insurmountable with the result that the articles obtained are largely imperfect. This is particularly the case in using rubber dispersions such as latex or compounded latex which tends to entrap and hold tenaciously minute bubbles of air. The subsequent gelling of the dispersion serves effectively to hold these bubbles permanently.

An object of the present invention is to provide a method and an apparatus whereby the above difficulties will be obviated and whereby articles such as battery separators may be made, free from defects, from aqueous dispersions.

In our invention the latex to be gelled is enclosed in a succession of narrow spaces between successive separating plates. These plates may be arranged either in a horizontal or a vertical series. The rubber dispersion may be placed in position and separated into separate bodies without the necessity of pouring into thin narrow chambers. After the plates and the dispersion are assembled, the plates may be tightened to the required spacing, any displacement of the latex taking place upwardly so as to displace air without danger of entrapment.

In the accompanying drawings—

Figs. 1 and 2 are vertical side and end views of an apparatus embodying a preferred form of the invention, parts being broken away to show the manner of inserting and placing the separating mold plates.

Fig. 3 is a face view of a mold plate.

Figs. 4, 5, 6, 7 and 8 are, respectively, sections on the lines 4—4, 5—5, 6—6, 7—7 and 8—8.

Fig. 9 is a side view of a modified form of the invention showing an arrangement of mold plates in a vertical sequence or series.

Fig. 10 is a vertical section of a lower part of the apparatus of Fig. 9.

Figs. 11 and 12 are, respectively, vertical and top plan views of a modified form of molding plate.

Referring more particularly to Figs. 1 to 8 inclusive, the dispersion to be molded is placed or poured into a box 15 into which are then placed an end mold plate 16 and a series of intermediate mold plates 17. The latex or dispersion is poured or placed into the box 15, preferably before the mold plates 16 and 17 are placed in position therein. Sufficient latex is placed in the box so that when the mold plates 16 and 17 are in position the latex or dispersion will fill the box at least to the desired level. Compounded latex or dispersion may be placed in the box in excess of that required and the excess permitted to overflow as the plates 16 and 17 are positioned. Inasmuch as the plates 16 and 17 may be lowered into the box after the latex is in position, it will be apparent that the latex rises upwardly between the mold plates instead of being poured downwardly against the air being displaced. The mold plates 16 and 17 are provided with edge spacers so that after they have been placed in position in the box 15 they may be subjected to pressure, forcing them into close contact and ensuring the exact spacing provided by the spacers. Any suitable means may be employed for providing this pressure, the wedge 18 forced downwardly by the screw 19 against the reversely inclined wedge piece 20 being a convenient form and acting in the manner of a quoin.

The screw 19 is mounted in a cover 21 which may be placed in position after the box has been filled with latex and the mold plates may be secured tightly or hermetically by means of screw bolts 22.

The mold plates 17 may be of any suitable shape or dimension, depending upon the shape or dimension of the microporous plate or article to be formed. Preferably they are of about the same dimensions as the internal cross sectional dimensions of the box 15.

In the specific form shown in Figs. 3 to 8 inclusive, the side edges of the plates 17 are provided with spacing projections 23 extending from the back of the plate, there being one projection 23 at each side edge. Similarly, a spacing projection or projections 24 extends forwardly from the upper and lower edges of the plate. The distance from the back of the plate to the front edge of the projection 24 is equal to the distance from one face of the projection 23 to the opposite surface of the plate so that the projections serve to space the plates equally at the side, top and bottom edges. The front face of the plates 17 is provided with a number of projections and grooves, respectively, 25, 26, 27 and 28 for the purpose of anchoring the dispersion after it has been gelled and thus prevent the side edges from drawing inwardly as the dispersion vulcanizes and shrinks, this type of mold plate being the subject of an application by Madge, S. No. 503,173 filed December 18, 1930.

The mold plate surfaces may also be provided with vertical grooves 29 which form thickened rib elements on the molded structure. These grooves 29 open upwardly through the upper and lower front spacers 24 as is indicated in Fig. 7 and thereby permit air and liquid to be readily displaced upwardly from the spaces between the mold plates. In the form shown in Fig. 6 the projections 25 and 26 are in the end vertical grooves 29. The end plates 16 are similar to the intermediate mold plates 17 except that the back spacer 23 may be omitted and the plates may be made somewhat thicker to withstand the pressure of the wedge 18.

In the form of the invention shown in Figs. 9 and 10, the mold plates 30 are arranged in a vertical sequence or pile but, in this case also, the plates are positioned after the latex or dispersion has been placed in position. For this purpose a quantity of latex or dispersion is placed in a lowermost plate 31 having upturned edges to hold the latex and resting on a supporting bed plate 32. Thereupon the plate 30 is placed on the plate 31 so that the necessity of pouring latex into the narrow space between the plates is avoided. As the plate 30 is lowered onto the plate 31, its lower face contacts with the upper surface of the latex or dispersion and closes out all air between the two plates.

To ensure against any entrapment between the latex surface and the lower face of the next plate as the latter is being lowered into contact with the surface of the dispersion, the lower surfaces of the plates 30 are made slightly convex so that they contact first at the center of the latex and in a gradually outwardly extending area of contact which displaces the air progressively toward the edges of the plates 31 or the next lower plate 30. To ensure complete expulsion of the air, the plate 31 and each of the succeeding plates 30 may be filled sufficiently with the dispersion so that as the plate 30 next above is lowered it will displace latex toward the edges and cause it to overflow. To enable the plates to be lowered after the liquid retaining face of each plate is completely filled, overflow spouts 33 may be provided, these spouts being so positioned at the upper edges of the plates so as to prevent overflow except of latex displaced by the plate next above after the air has been completely expelled. Grooves 34 may be provided in the under surface of each of the plates 30 to provide strengthening ribs in the completed microporous article. These grooves 34 intersect to permit free passages for the expulsion of air, however.

After all of the plates 30 have been placed in position and the mold spaces between them have been filled with dispersion or latex, they are subjected to pressure vertically applied from a screw 35 through a pressure plate 36 retained in a frame 37 so as to bring the edges of the plates tightly together and ensure uniform spacing.

The form of plates shown in Figs. 11 and 12 is similar to that of Figs. 9 and 10 except that dams or partitions 38 are provided to separate the molded article into a number of separate plates of similar dimensions. As shown in Fig. 11, each succeeding plate 30 will rest on the next lower plate not only at the side edges, but also on the partitions 38, completely separating the space between the plates into separate compartments and thereby forming separate battery plates. In this case also the space on each plate is completely filled with latex or compounded dispersion before the next plate is brought into position to form a narrow mold chamber so that no opportunity is afforded for the entrapment of air particles as would be the case if the latex were poured downwardly into narrow mold spaces or chambers.

After the dispersion has been placed in the mold it is gelled in any suitable manner as, for example, by having incorporated in it prior to placing in the mold a heat sensitive gelling agent and subjecting the dispersion to heat after it is placed in the mold.

It will be understood that the aqueous dispersions or compounded latex may comprise any suitable rubber-like material such as any of the natural rubber latices, gutta percha or balata latices or similar vegetable latices, or may be of artificially manufactured dispersions. Aqueous dispersions of coagulated rubber, vulcanized rubber, synthetic rubber, waste or reclaim may also be employed, if desired, as alternatives or admixtures. The dispersions may contain any desired compounding ingredients or may be in concentrated form or unconcentrated as required. Concentrates such as obtained as described in United States Patent No. 1,846,164 February 23, 1932, may be employed. These and other similar latices or dispersions are referred to generically as aqueous dispersions of rubber material.

After the dispersion has been molded in place and gelled it is vulcanized under such conditions as to prevent evaporation or escape of water. This may be accomplished by sealing the molded material and plates hermetically, as by hermetically sealing the cover 21 on the box 15 and heating in a dry atmosphere. But, preferably, it is accomplished by placing the gelled molded articles into boiling water maintained at the proper vulcanizing temperature, thereby ensuring against evaporation or loss of water from the gelled material.

In the lowering of plates into a body of dispersion or latex it will be apparent that there is a relative rise in the surface of the latex between the plates so that the relation of the latex or dispersion and the adjacent body of air is always normal and is most favorable to the avoidance of entrapment. It will be understood that the plates may also be spaced more widely apart while being lowered and may be brought to their proper spacing after these spaces have been filled to the desired level with the aqueous dispersion.

What we claim is—

1. A method of forming plates of microporous rubber which comprises placing separate plates between successive inter-positioned bodies of aqueous dispersion of rubber material and thereafter bringing each of said plates to a fixed distance from the next adjacent plate and thereby displacing the dispersion between said plates to a predetermined thickness, gelling said dispersion, and vulcanizing while preventing the escape of water from the gelled dispersion.

2. The method of claim 1 in which the plates are arranged in a vertical series one on the other.

3. The method of claim 1 in which the plates are built up vertically by filling a plate and placing the next adjacent plate above into the filled plate.

4. The method of claim 1 in which the plates are arranged in vertical series and in which each plate is filled with the aqueous dispersion and the next succeeding plate is placed downwardly in contact with the surface of the dispersion in an area of contact increasing from the center outwardly.

5. A method of forming plates of microporous rubber which comprises displacing spaced mold plates edgewise into a body of aqueous dispersion, bringing said plates to a definite spacing, gelling said dispersion and vulcanizing it while preventing the escape of water therefrom.

6. A method of forming plates of microporous rubber which comprises inserting mold plates in spaced relation downwardly into a body of aqueous dispersion, bringing said plates to a predetermined spacing, gelling said dispersion and vulcanizing it without loss of water therefrom.

7. A method of forming plates of microporous rubber which comprises inserting mold plates in spaced relation into a body of aqueous dispersion of rubber material by a relative movement of said plates edgewise into said body of dispersion, thereafter bringing said plates to a predetermined spacing, gelling said dispersion and vulcanizing it without loss of water.

8. A method of forming plates of microporous rubber material which comprises raising the surface of a body of aqueous dispersion relatively upwardly in the spaces between plates to fill said spaces, thereafter gelling said aqueous dispersion and vulcanizing it without loss of water.

9. Apparatus for forming plates of microporous rubber which comprises a container for aqueous dispersions of rubber, a series of mold plates insertable downwardly into said container and having spacers at their side edges to form mold spaces between successive plates.

10. Apparatus for forming plates of microporous rubber which comprises a container for aqueous dispersions of rubber, a series of mold plates insertable downwardly into said container and having spacers at their side edges to form mold spaces between successive plates, and means to apply pressure endwise to the plates within said container.

11. The apparatus of claim 9, and means for sealing said container.

WALTER GEORGE GORHAM.
GEOFFREY WILLIAM TROBRIDGE.